(12) United States Patent
Fankhauser et al.

(10) Patent No.: US 9,658,419 B2
(45) Date of Patent: May 23, 2017

(54) ELECTRICAL-OPTICAL MEDIA CONVERSION SYSTEM

(75) Inventors: Eric Fankhauser, Burlington (CA); Daniel Baldor, Toronto (CA); Sarkis Abrahamian, Binbrook (CA)

(73) Assignee: Evertz Microsystems Ltd., Burlington (CA)

( * ) Notice: Subject to any disclaimer, the term of this patent is extended or adjusted under 35 U.S.C. 154(b) by 420 days.

(21) Appl. No.: 12/632,381

(22) Filed: Dec. 7, 2009

(65) Prior Publication Data
US 2011/0135316 A1 Jun. 9, 2011

(51) Int. Cl.
*H04B 10/00* (2013.01)
*G02B 6/44* (2006.01)

(52) U.S. Cl.
CPC .................. *G02B 6/4453* (2013.01)

(58) Field of Classification Search
CPC ........ H04B 10/40; H04B 1/38; G02B 6/4453; G02B 6/4246; G02B 6/4416; G02B 6/4284; G02B 6/4201; G02B 6/36; G02B 6/3817; H01L 2924/14; H01L 2224/05009; H05K 3/32; G06F 17/5068
USPC ................ 398/135–139, 164, 202, 115–117
See application file for complete search history.

(56) References Cited

U.S. PATENT DOCUMENTS

| | | | | | |
|---|---|---|---|---|---|
| 6,038,102 | A * | 3/2000 | Balakrishnan | ....... | G11B 5/4853 360/264.2 |
| 6,884,937 | B1 * | 4/2005 | Mistry | ........ | G02B 6/3897 174/353 |
| 7,131,859 | B1 * | 11/2006 | Zumbrunnen | ....... | G02B 6/4201 439/487 |
| 7,171,081 | B1 * | 1/2007 | Ko et al. | ......... | 385/39 |
| 7,179,096 | B2 * | 2/2007 | Dube | ............ | H01R 23/68 439/76.1 |
| 7,401,985 | B2 * | 7/2008 | Aronson | .......... | G02B 6/4416 385/89 |
| 7,445,389 | B2 * | 11/2008 | Aronson | .......... | G02B 6/4292 385/88 |
| 7,463,472 | B1 * | 12/2008 | Bell | ........... | H01Q 1/50 361/118 |
| 7,822,346 | B2 * | 10/2010 | Rosenberg | ............ | 398/138 |
| 7,876,989 | B2 * | 1/2011 | Aronson | .......... | G02B 6/4292 385/101 |
| 8,083,417 | B2 * | 12/2011 | Aronson | .......... | G02B 6/3817 385/14 |

(Continued)

*Primary Examiner* — Hibret Woldekidan
(74) *Attorney, Agent, or Firm* — Bereskin & Parr LLP/S.E.N.C.R.L., s.r.l.

(57) ABSTRACT

A media conversion system for converting electrical video signals to optical video signals and vice versa. The media conversion system includes one or more pluggable media conversion modules. Each pluggable media conversion module converts between one or more optical video signals and one or more electrical video signals. Each pluggable media conversion module typically includes an electrical video signal conditioning circuit that includes one or more of a cable driver, an equalizer and a reclocker. The media conversion system also includes a printed circuit board for receiving the one or more pluggable media conversion modules. The printed circuit board includes one or more signal paths for transporting the one or more electrical video signals between the one or more pluggable media conversion modules and one or more electrical cable connectors. Each of the one or more signal paths is completely passive.

20 Claims, 11 Drawing Sheets

(56) References Cited

U.S. PATENT DOCUMENTS

| | | | |
|---|---|---|---|
| 8,457,153 B2 * | 6/2013 | Nguyen | H04B 10/40 370/463 |
| 2002/0196501 A1 * | 12/2002 | Buss | H04B 10/40 398/139 |
| 2004/0127102 A1 * | 7/2004 | Poplawski et al. | 439/630 |
| 2007/0228532 A1 * | 10/2007 | Echols | H01L 21/563 257/678 |
| 2007/0237463 A1 * | 10/2007 | Aronson | 385/89 |
| 2008/0050074 A1 * | 2/2008 | Dallesasse | G02B 6/4201 385/92 |
| 2008/0107424 A1 * | 5/2008 | Tonietto et al. | 398/136 |
| 2009/0060425 A1 * | 3/2009 | Aronson | 385/88 |
| 2009/0060531 A1 * | 3/2009 | Biegert | H04L 12/2856 398/214 |
| 2009/0100502 A1 * | 4/2009 | Li | 726/2 |
| 2009/0134995 A1 * | 5/2009 | Wardlaw, III | B23K 37/006 340/532 |
| 2010/0129035 A1 * | 5/2010 | Teo | G02B 6/4201 385/88 |
| 2010/0150569 A1 * | 6/2010 | Umnov et al. | 398/139 |
| 2011/0075616 A1 * | 3/2011 | Baldwin | H04W 88/085 370/329 |
| 2015/0326376 A1 * | 11/2015 | Dabiri | H04L 5/1423 370/276 |

* cited by examiner

ELECTRICAL-OPTICAL MEDIA CONVERSION SYSTEM

FIELD

The described embodiments relate to electrical-optical media conversion systems for use in video systems. More particularly, the described embodiments relate to electrical-optical media conversion systems wherein all of the active components reside on compact pluggable media conversion modules.

BACKGROUND

Telecommunications equipment for converting electrical signals to optical signals and for converting optical signals to electrical signals is useful in various applications. For example, electrical-to-optical and optical-to-electrical converters are useful in applications, such as high-definition television (HDTV) applications, where signals arrive in electrical media but must be transmitted or distributed over distances greater than is possible with a continuous electrical conductor. Electrical conductors can carry signals over only relatively limited distances due to signal attenuation. In contrast, fiber optic conductors can carry signals over distances many times greater than electrical conductors. Electrical signals, however, are easier to manipulate for media purposes than optical signals. Therefore, it is common to apply an electrical-to-optical conversion to a signal prior to distribution or long-distance transmission, and then apply an optical-to-electrical conversion near the destination.

Some of the most common optical-electrical converters used in telecommunication and data communication applications are Small Form Factor Pluggable (SFP), Small Form Factor Pluggable Plus (SFP+), and 10 Gigabit Small Form Factor Pluggable (XFP) converters because they are compact, and hot-pluggable. The specific standards for SFP converters are set out in the "Small Form Factor Pluggable (SFP) Transceiver Multi-Source Agreement (MSA)" dated Sep. 14, 2000.

However, most conventional SFP, SPF+, and XFP converters are not suitable for video applications. First, conventional SFP, SFP+ and XFP converters are bidirectional and have both electrical-to-optical and optical-to-electrical conversion circuits. Since video systems commonly use unidirectional signals, half of a conventional SFP, SFP+ or XFP converter is unused or wasted in video systems.

Second, professional digital video signals, such as serial digital interface (SDI) and high-definition serial digital interface (HD-SDI) video signals, contain pathological patterns (patterns with long duration of "0's" or "1's") which conventional SFP, SFP+ and XFP converters cannot accurately process. One specific pathological pattern consists of 19 bits of one polarity followed by one bit of the opposite polarity. This produces a signal with either a very high or very low duty cycle. Conventional optical transmitter modules have an automatic power control circuit that keeps the optical power output at a set level. These circuits assume incoming data will have a constant average duty cycle of about 50% over a period of time (e.g. 1 µs). Since a pathological pattern may last for up to 63.5 µs, the laser driver output of the optical transmitter would be adjusted too high or two low, depending on the duty cycle of the signal. Accordingly, conventional SFP, SFP+, and XFP convertors cannot typically process professional digital video signal without producing data errors.

Third, conventional SFP, SFP+ and XFP convertors cannot directly receive a single-ended unbalanced signal. Specifically, most conventional SFP, SFP+ and XFP can only receive a differential balanced signal. Therefore most conventional SFP, SFP+ and XFP converters must be connected to an external conversion module to convert the single-ended unbalanced signal received from the cable to a differential balanced signal.

To address these issues, manufacturers have recently developed special video SFP, SFP+, and XFP converters.

SUMMARY

Embodiments described herein relate to electrical-optical media conversion systems for use in video systems. More particularly, the described embodiments relate to systems for converting single-ended unbalanced electrical video signals to optical video signals and vice versa wherein all of the active components (those components requiring power) required for the conversion reside on compact, hot-pluggable media conversion modules.

In a first aspect, some embodiments of the invention provide a media conversion system. The media conversion system includes: at least one pluggable media conversion module, the pluggable media conversion module for converting between at least one optical video signal and at least one electrical video signal; and a printed circuit board for receiving the at least one pluggable media conversion module, the printed circuit board comprising at least one signal path for transporting the at least one electrical video signal between the at least one pluggable media conversion module and at least one electrical cable connector, the at least one signal path being completely passive.

In one feature of that aspect, the printed circuit board is completely passive.

In another feature of that aspect, the at least one pluggable conversion module comprises a conditioning circuit for conditioning the at least one electrical video signal.

In another feature of that aspect, the conditioning circuit comprises at least one of a cable driver, an equalizer, and a reclocker.

In another feature of that aspect, the at least one pluggable media conversion module comprises a conversion circuit for converting between the optical video signal and the electrical video signal.

In another feature of that aspect, the function of the conversion circuit is to perform one or more of converting the at least one optical video signal to the at least one electrical video signal, and converting the at least one electrical video signal to the at least one optical video signal.

In another feature of that aspect, the function of the conversion circuit dictates the function of the at least one electrical cable connector connected thereto.

In another feature of that aspect, the system also includes a fan unit proximate the printed circuit board for dissipating heat created by the at least one pluggable media conversion module.

In another feature of that aspect, the at least one electrical video signal is a single-ended unbalanced signal.

In another feature of that aspect, the at least one pluggable media conversion module comprises at least one optical port for receiving an optical cable, the optical cable for carrying the at least one video optical signal.

In another feature of that aspect, the printed circuit board comprises at least one host unit adapted to receive the at least one pluggable media conversion module.

In another feature of that aspect, the at least one electrical cable connector is adapted to receive an electrical signal cable for carrying the at least one electrical video signal.

In another feature of that aspect, the printed circuit board comprises at least one electrical trace for connecting the at least one host unit to the at least one electrical cable connector.

In another feature of that aspect, the at least one electrical trace is a microstrip.

In another feature of that aspect, the at least one electrical trace is a stripline.

In a second aspect, some embodiments of the invention provide a pluggable media conversion module. The pluggable media conversion module includes: an optical port for receiving a fiber optic cable, wherein the fiber optic cable carries an optical signal; a conversion circuit for converting between the optical signal and an electrical signal; and a conditioning circuit for conditioning the electrical signal, the conditioning circuit comprising at least one of a cable driver, equalizer and reclocker.

In one feature of that aspect, the conversion circuit converts the optical signal to the electrical signal.

In another feature of that aspect, the conversion circuit converts the electrical signal to the optical signal.

In another feature of that aspect, the at least one electrical video signal is a single-ended unbalanced signal.

BRIEF DESCRIPTION OF THE DRAWINGS

A preferred embodiment of the present invention will now be described in detail with reference to the drawings, in which.

DESCRIPTION OF EXEMPLARY
EMBODIMENTS

Embodiments described herein relate to electrical-optical media conversion systems for use in video systems. More particularly, the described embodiments relate to systems for converting single-ended unbalanced electrical video signals to optical video signals and vice versa wherein all of the active components (those components requiring power) required for the conversion reside on compact, hot-pluggable media conversion modules. One of the advantages of the systems described herein is that since all of the active components reside on the pluggable media conversion modules, failure of an active component can easily be rectified by swapping out the "bad" pluggable media conversion module with a "good" pluggable media conversion module. Another advantage of the systems described herein is that because all of the active components reside on the pluggable media conversion modules, it is the pluggable media conversion modules that dictate the function of the port to which they are plugged in. Specifically, the pluggable media conversion modules can be single transmit, single receive, dual transmit, dual receive, transmit/receive (transceiver), or optical regeneration modules. Since the pluggable media conversion modules contain all of the active components they can be plugged into any port in the main chassis and their configuration will dictate the function of the port in which they are plugged in.

Figure 1A:
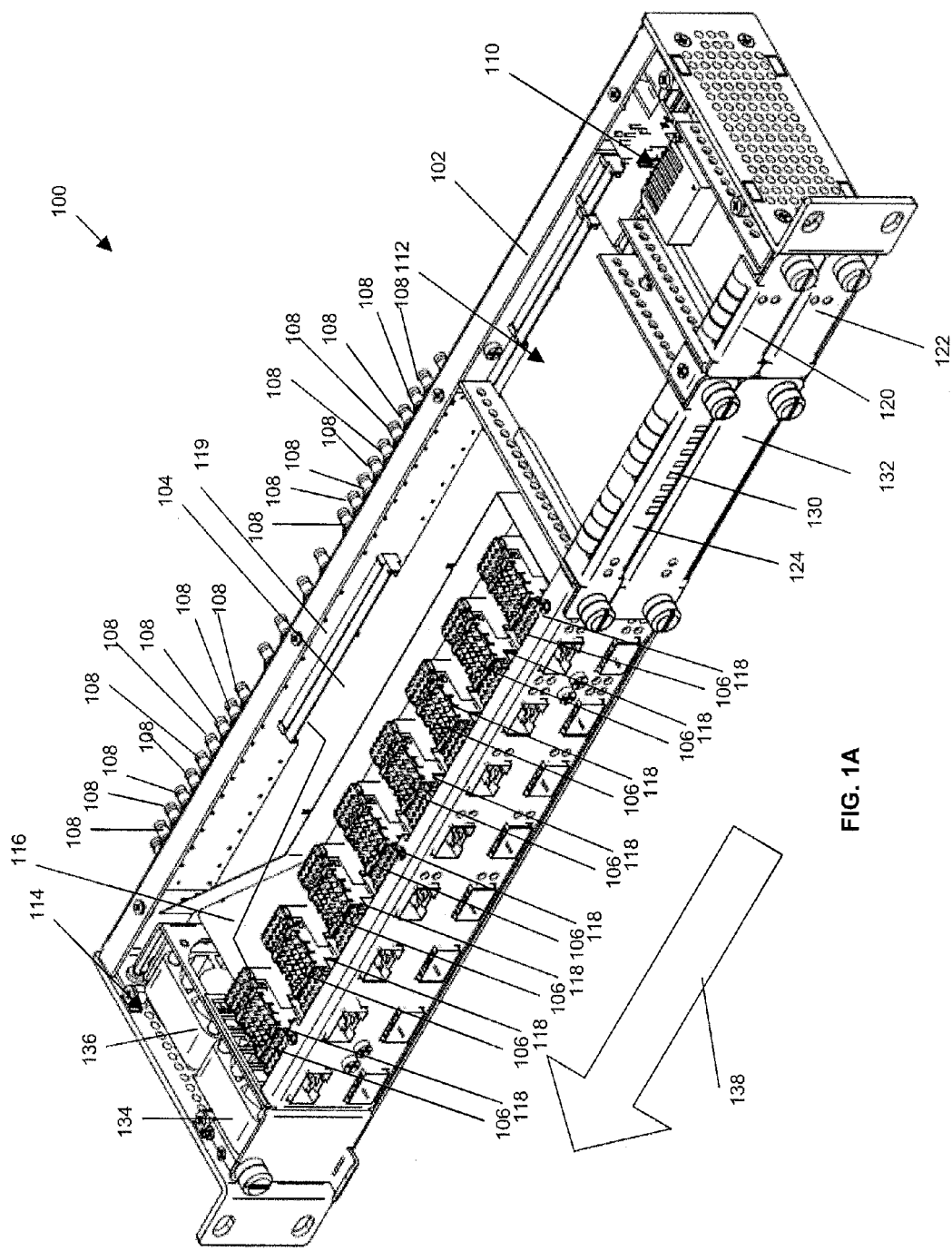
FIG. 1A is an isometric view of a media conversion system for converting optical signals into electrical signals and vice versa in accordance with an embodiment.
Figure 1B:
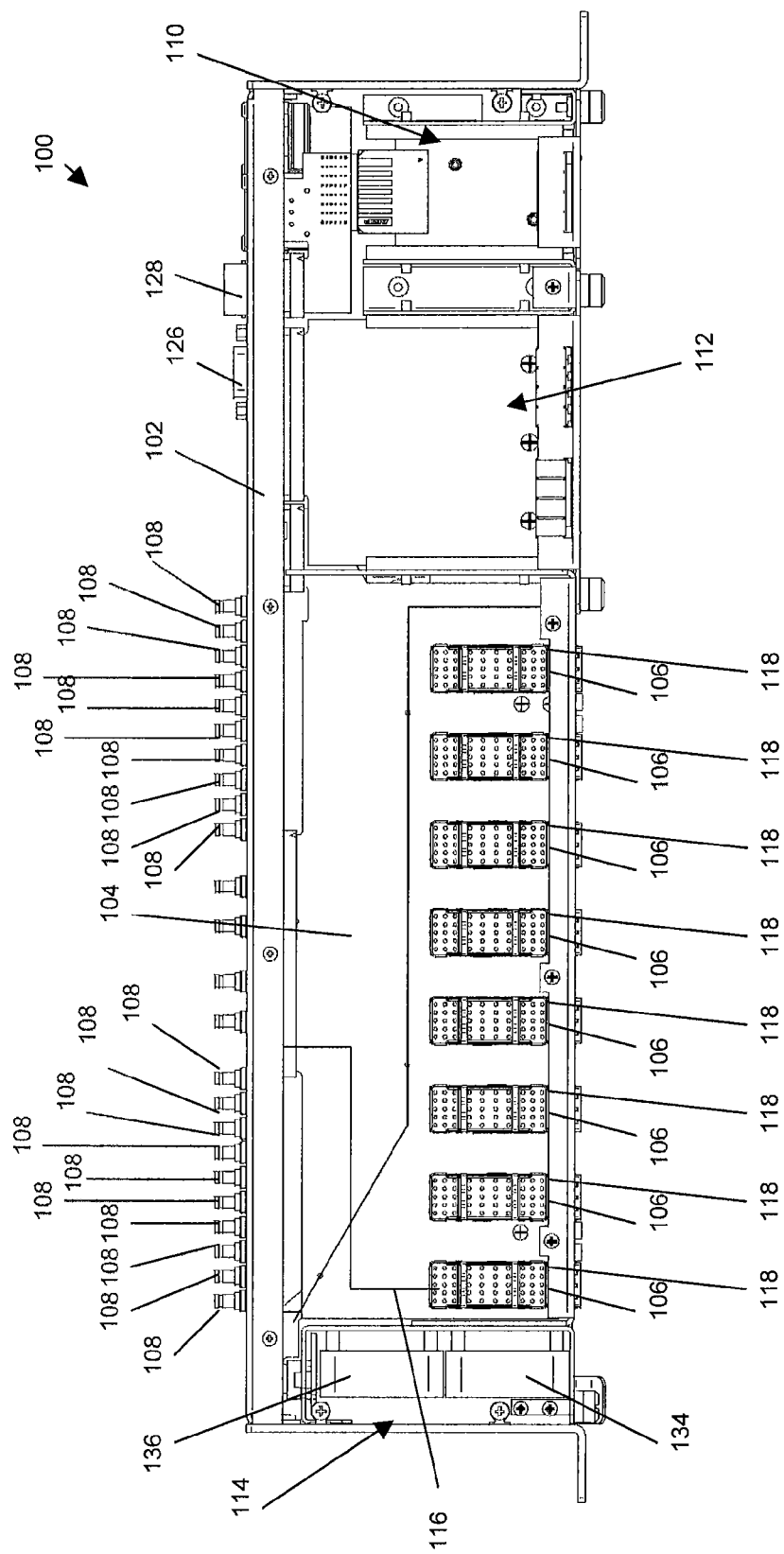
FIG. 1B is a top view of the media conversion system of FIG. 1A.
Figure 1C:
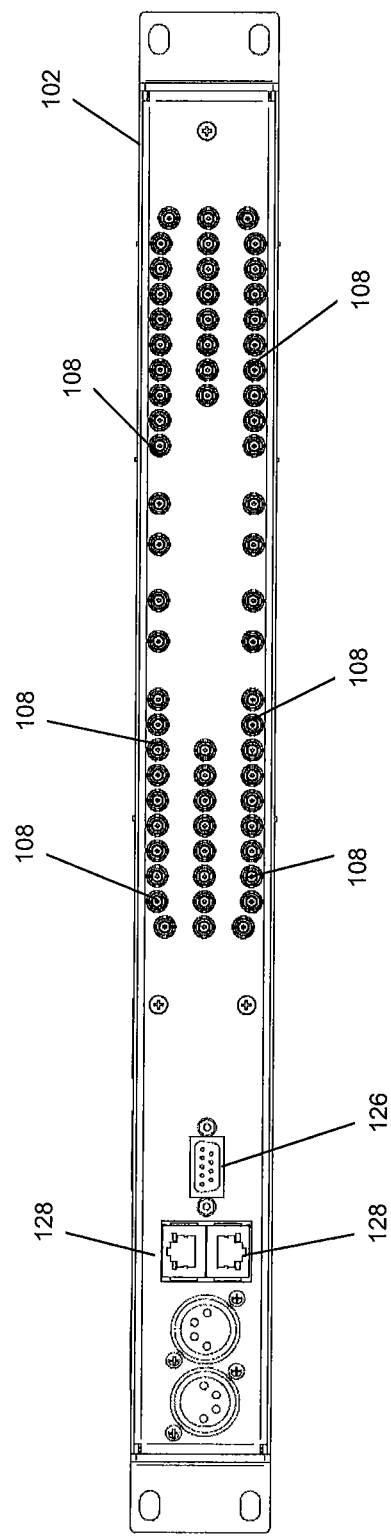
FIG. 1C is a rear view of the media conversion system of FIG. 1A.

Reference is now made to FIGS. 1A to 1C in which a media conversion system 100 for converting optical video signals to electrical video signals and vice versa in accordance with an embodiment is illustrated. The media conversion system 100 includes a chassis 102; two main printed circuit boards (PCBs) 104; a plurality of host units 106 configured to receive a pluggable media conversion module (FIG. 3); one or more electrical cable connectors 108 mounted to the PCB 104; a power unit 110; a configuration and monitoring unit 112; and a fan unit 114.

The chassis 102 is configured to receive and house the printed circuit boards 104, the power unit 110, the configuration and monitoring unit 112, and the fan unit 114. The chassis 102 has an overall width W1, an overall height H1 and an overall length L1. In one embodiment the chassis 102 has a height H1 of 1 RU (rack unit) or 1.75 inches. In other embodiments, the chassis 102 may have a different height H1. The chassis 102 may be rack mountable as shown in FIGS. 1A to 1C.

The main printed circuit boards 104 are mounted in the chassis 102. In the embodiment shown in FIGS. 1A to 1C, there are two main PCBs 104 vertically stacked within the chassis 102. However, it will be evident to a person of skill in the art that the system 100 may include only one PCB 104 or it may include more than two PCBs and the PCBs may be installed in the chassis using suitable other means. For example, the PCBs may be vertically stacked or horizontally stacked. In one embodiment, one of the main printed circuit boards 104 is affixed to the chassis 102 by a plurality of screws (not shown). However, it will be evident to a person of skill in the art that the main printed circuit boards 104 may be mounted to the chassis 102 using other suitable means.

The main printed circuit boards 104 electrically connect the various components of the system 100. Specifically, the main PCBs 104 electrically connect (i) each host unit 106 to one or more electrical cable connectors 108; (ii) the power unit 110 to the host units 106; and (iii) the configuration and monitoring unit 112 to the host units 106.

Each main PCB 104 includes a plurality of host units 106 adapted to receive pluggable media conversion modules; a plurality of electrical cable connectors 108; and a plurality of high speed traces 116 electrically connecting the host units 106 and the electrical cable connectors 108. Each main PCB 104 also typically includes a plurality of electrical contacts (not shown) that are designed to mate with or contact corresponding electrical contacts in the configuration and monitoring unit 112 to provide electrical connectivity between the host units 106 (and ultimately the pluggable media conversion modules plugged therein), the configuration and monitoring unit 112 and the power unit 110.

Each of the host units 106 is adapted to receive a pluggable media conversion module. The pluggable media conversion modules convert one or more single-ended electrical video signals to optical video signals and/or one or more optical video signals into single-ended electrical video signals. Typically each pluggable media conversion module includes one or more optical connector for receiving an optical cable terminated with a complementary optical connector, and conversion circuitry for either (i) converting the optical video signal carried by the optical cable to an electrical video signal; or (ii) converting a received electrical video signal into an optical video signal and transmitting or outputting the optical signal on the optical cable. The pluggable media conversion modules may be one of the following types: a single receiver (RX) pluggable media conversion module capable of receiving a single optical signal; a single transmitter (TX) pluggable media conversion module capable of transmitting a single optical signal; a dual receiver (RX) pluggable media conversion module capable of receiving two optical signals; a dual transmitter (TX) pluggable media conversion module capable of transmitting two optical signals; a transceiver (TX/RX) pluggable media conversion module capable of receiving a single optical signal and transmitting a single optical signal; and an optical regenerator media conversion module capable of receiving a single optical signal, regenerating and transmitting the single optical signal, and outputting multiple electrical copies of the single optical signal. Each pluggable media conversion module, regardless of the type, includes all of the active components required to convert and condition the signal. Exemplary pluggable media conversion modules will be described in reference to FIGS. 3-8.

Each host unit 106 may include a cage 118 that is sized to receive a pluggable media conversion module. Each cage 118 typically has two opposing side panels, a top panel, a bottom panel and a back panel. The front of the cage 118 is typically open to allow insertion of a pluggable media conversion module therein. In some embodiments, the cage 118 may be a standard SFP, SFP+ or XFP cage.

Each cage 118 may also include a large hole in the top panel that is sized to receive a heat sink which helps dissipate the heat produced by the pluggable media conversion modules. In some embodiments, the heat sink may be a standard SFP+heat sink.

Each host unit 106 typically also includes electrical contacts or pins that are designed to mate with corresponding electrical contacts or pins of the pluggable media conversion module when the pluggable media conversion module is inserted in the cage 118. When the electrical contacts or pins of the host unit 106 mate or come in contact with the electrical contacts or pins of the pluggable media conversion module, they form an electrical connection between the main PCB 104 and the pluggable media conversion module. It is through this electrical connection that (i) power is provided from the power unit 110 to the pluggable media conversion module; (ii) electrical video signals are transmitted to and/or received from the pluggable media conversion module; and (iii) the configuration and monitoring unit 112 communicates with the pluggable media conversion module.

In one embodiment, the electrical contacts or pins of the host unit 106 are formed on a socket which is sized to receive a corresponding male portion of a card edge connector, or a corresponding male portion of a ribbon connector. Each of the pluggable media conversion modules (regardless of the type of pluggable media conversion module) include the corresponding male portion of the card edge connector, or the corresponding male portion of a ribbon connector, so that any of the pluggable media conversion modules can be plugged into or inserted into any of the host units 106.

Some of the electrical contacts of each host unit 106 are connected to a high-speed trace 116 which links the host unit 106 (and ultimately the pluggable media conversion module plugged therein) to one or more electrical cable connectors 108. Typically, as shown in FIGS. 1A and 1B, each host unit 106 (and ultimately each pluggable media conversion module) is connected to four electrical cable connectors 108. Accordingly, each host unit 106 typically has at least two electrical contacts that are electrically connected to two high speed traces 116. However, each host device 106 may be connected to other numbers of electrical cable connectors 108, and thus a different number of high-speed traces 116.

Each high speed trace 116 is essentially a data highway that is used to transport electrical video signals between one of the electrical cable connectors 108 and one of the host units 106 (and ultimately the pluggable media conversion module plugged therein). For example, a high speed trace 116 may be used to transport electrical video signals received by one of the electrical cable connectors 108 to one of the host units 106 (and ultimately one of the pluggable media conversion modules plugged therein), or it may be used to transport electrical video signals generated by one of the pluggable media conversion modules to one of the electrical cable connectors 108. Since all of the active components required to convert and condition the signals reside on the pluggable media conversion modules, the high speed traces 116 are completely passive. This is in contrast to most media conversion systems wherein the active components of the conditioning circuitry are external to the pluggable media conversion modules and thus form part of the signal path between the pluggable media conversion module and the corresponding electrical cable connector.

Each high-speed trace 116 may be a transmission line with low loss characteristics. In some embodiments, the high-speed traces 116 are striplines. As is known to a person of skill in the art, a stripline circuit includes a flat strip of conductive material (i.e. metal) inserted in a dielectric substrate. The dielectric substrate is then sandwiched between two parallel ground planes. By enclosing the conductive material, the transmission line has a controlled impedance to ground. To prevent the propagation of unwanted modes, the ground planes are typically shorted together. This may be achieved by rows of vias running parallel to the strip on each side. Striplines can be contrasted from microstrips by the fact that a microstrip is not sandwiched between two ground planes, it is on a surface layer of the substrate above a ground plane.

Generally, it is desirable to keep the physical length of the high-speed traces 116 to a minimum to ensure minimal signal degradation. For example, each high-speed trace 116 is typically less than 2 inches. However, in some embodiments, the high-speed traces 116 may be longer. In various embodiments, have implemented high-speed traces 116 of approximately 8 inches, 12 inches and even longer. However, increased high-speed trace 116 lengths will result in increased signal attenuation. The ability to implement a passive signal path in any particular embodiment may be limited depending on the characteristics of the transmitted signal and the attenuation effects.

Since the main PCB 104 simply provides connections between the host units 106 (and ultimately the pluggable media conversion modules) and the electrical cable connectors 108 via the high-speed traces 116, the function or role of the electrical cable connectors 108 is defined by the pluggable media conversion module plugged into the corresponding host unit 106. For example, if a dual receiver (RX) pluggable media conversion module is inserted into a first host unit 106 then both of the corresponding electrical cable connectors 108 will be transmit (TX) devices. Conversely, if a dual transmitter (TX) pluggable media conversion module is inserted in the same host unit 106 then both of the corresponding electrical cable connectors 108 will be receive (RX) devices. This is different than most prior art systems where the function of the electrical cable connectors is defined by the external conditioning circuits hardwired to the electrical cable connectors 108. There are a few prior art systems where the function of the electrical cable connectors is defined by the pluggable media conversion module connected thereto, however, in these systems, since the pluggable media conversion module does not include the conditioning circuitry, both input and output conditioning circuitry have to be attached to all electrical cable connectors to allow them to be flexible. This adds a lot of duplicate circuitry.

The fact that the type of pluggable media conversion module attached thereto defines the function of the electrical cable connectors 108 allows the system 100 to be user configurable. Specifically, the user can build a system that has the specific the number of transmit and receive ports required by the user's specific needs.

In the embodiment shown in FIG. 1, each main PCB 104 includes eight host units 106 and thirty-two electrical cable connectors 108, and each host unit 106 is electrically connected to two electrical cable connectors 108. However PCBs with other numbers of host units and electrical cable connectors are also possible.

As can be seen in FIGS. 1A and 1B, the main PCB 104 does not contain any active components, where an active component is defined as a component that requires power. All of the active components (i.e. equalizers, line drivers, and reclockers) are within the pluggable media conversion modules. Since active components (components that require powers) are more likely to fail than passive components (components that do not require power), it is more likely that one of the pluggable media conversion modules will fail than the main PCB 104. This is a benefit of the system 100 described herein since a failure of a pluggable media conversion module is easier to correct than a failure of the main PCB 104. All that is required to correct a failed pluggable media conversion module is to remove the "bad" pluggable media conversion module and replace it with a "good" pluggable media conversion module. In this manner only the line or lines that are attached to the "bad" pluggable media conversion module are affected by the failure. Contrast this to a situation where the main PCB includes the active components. In this situation, a failure of any of the active components would require replacement of the entire main PCB which would interrupt or decommission all of the lines running through the PCB.

Each electrical cable connector 108 is connected to one of the main PCBs 104. In one embodiment, each of the electrical cable connectors 108 is directly mounted on one of the main PCBs. In other embodiments, such as that shown in FIG. 1A to 1C, each of the electrical cable connectors 108 is mounted to a single backplane card 119 which is connected to the main PCBs 104.

Each electrical cable connector 108 is configured to receive an electrical signal cable terminated with a complementary electrical cable connector. An electrical signal cable is defined any type of cable that can be used to carry an electrical signal. Electrical signal cables include, coaxial cables with BNC connectors or mini-DIN connectors, and triaxial cables. In the embodiment shown in FIGS. 1A to 1C, the electrical cable connectors 108 are female mini-DIN connectors that can receive coaxial cables terminated with a complementary male mini-DIN connector.

Each electrical cable connector 108 may (i) receive an electrical video signal from the corresponding electrical signal cable, and provide the received electrical video signal to the main PCB 104 to be converted to an optical signal by a pluggable media conversion module, or (ii) receive an electrical signal from the main PCB 104 that has already been converted from an optical signal by a corresponding pluggable media conversion module, and transmit the received electrical signal on the corresponding electrical signal cable.

The power unit 110 houses one or more power supplies 120, 122 that provide power to the components of the media conversion system 100 (including the pluggable media conversion modules). In some embodiments, the one or more power supplies 120, 122 can be inserted into the power unit 110 through the front of the chassis 102 and may be held in place using screws or other fastening means.

The power unit 110 typically includes an electrical connector for each power supply 120 and 122 that mates with a corresponding electrical connector on the power supply 120 or 122 to electrically connect the power supply 120 or 122 to the media conversion system 100. In some embodiments the electrical connectors are blind mating connectors.

In some embodiments, the power unit 110 is capable of housing multiple power supplies 120, 122 for redundancy. For example, the power unit 110 may be capable of housing two power supplies 120 and 122 where one of the power supplies 120 is a primary power supply and the other power supply 122 is a secondary or backup power supply. In this manner, if the primary power supply 120 fails, the secondary or backup power supply 122 may automatically take over. For further redundancy, the power supplies 120, 122 may be hot swappable. As is known to a person of skill in the art a device is hot swappable if it can be inserted and removed within a device while the device is running without causing any damage to the hot-swappable device.

The configuration and monitoring unit 112 houses components for configuring and monitoring the media conversion system 100. The configuration and monitoring unit 112 typically includes a frame or system controller 124 that is electrically connected to the host units 106 for monitoring and controlling the pluggable media conversion modules plugged therein. The frame or system controller 124 may also be connected to the power unit 110 and/or the fan unit 114 for monitoring these components as well. The configuration and monitoring unit 112 also typically includes a plurality of input/output (I/O) ports 126, 128 that allow external devices to communicate with the frame or system controller 124. For example, as shown in FIGS. 1A and 1B, the configuration and monitoring unit 112 may include one or more serial I/O ports 126, such as RS-232, RS-422, or V.24 ports, and one or more Ethernet ports 128. These I/O ports 126, 128 may be used to load in new code into the frame or system controller 124 or send monitoring data, such as SNMP (Simple Network Management Protocol) data to a remote device. For example, one of the Ethernet ports 128 may be connected to an Ethernet cable that is connected to a data network with an SNMP server. The frame or system controller 124 may then be configured to send SNMP messages to the SNMP server when certain events occur (e.g. when a pluggable media conversion module fails).

The configuration and monitoring unit 112 may also include a plurality of status indicators 130, such as light emitting diodes (LEDs), that indicate the status of components of the system 100. For example the status indicators 130 may indicate the health status of the pluggable media conversion modules (i.e. whether the pluggable media conversion module is "bad"); the presence of a signal (electrical or optical) at the host unit 106 input; the status of pluggable media conversion module laser; or the power level of the received optical signal. In some embodiments, the status indicators 130 (i.e. LEDs) are situated on the front of the frame or system controller 124. In other embodiments, the status indicators 130 (i.e. LEDs) may be affixed to the configuration and monitoring unit 112 and are electrically connected to the frame or system controller 124.

The configuration and monitoring unit 112 may also include one or more of the following: a passive optical multiplexer or de-multiplexer; splitter; optimal matrix switch; optical protection switch; electrical matrix switch; and electrical protection switch.

In some embodiments, the configuration and monitoring unit 112 has two vertically stacked bays or slots and the frame or system controller 124 is inserted into the upper bay or slot and other components (i.e. a passive optical multiplexer or de-multiplexer; splitter; optimal matrix switch; optical protection switch; electrical matrix switch; and electrical protection switch) are situated on a second module 132 that is inserted in the lower bay or slot. However, it will be evident to a person of skill in the art that the frame or system controller 124 may be inserted in either bay or slot. Typically the frame or system controller 124 is coupled to the second module to control the various components on the second module.

The fan unit 114 houses one or more fans 134, 136 for dissipating the heat produced by the pluggable media conversion modules when plugged into one of the main PCBs 104. Pluggable media conversion modules of the prior art do not typically include all the active components required to (i) convert an optical signal into an electrical signal or vice versa, and (ii) condition the received/generated electrical signal. Typically, the signal conditioning components (i.e. line driver and/or equalizer) are external to the pluggable media conversion module. Since each additional active component produces a significant amount of heat, placing the active signal conditioning components within the pluggable media conversion module means that the pluggable media conversion modules described in the present application produce more heat than traditional pluggable media conversion modules. For example, a standard SFP pluggable media conversion module produces only ¾ Wt of heat, whereas the pluggable media conversion modules described herein produce up to 2 Wt of heat.

To help dissipate the extra heat produced by the pluggable media conversion modules described herein, the fans 134, 136 are positioned to pull the air from the right-side of the main PCBs 104 to the left-side of the mains PCB 104 and out the side of the chassis 102 as indicated by arrow 138.

Figure 2A:
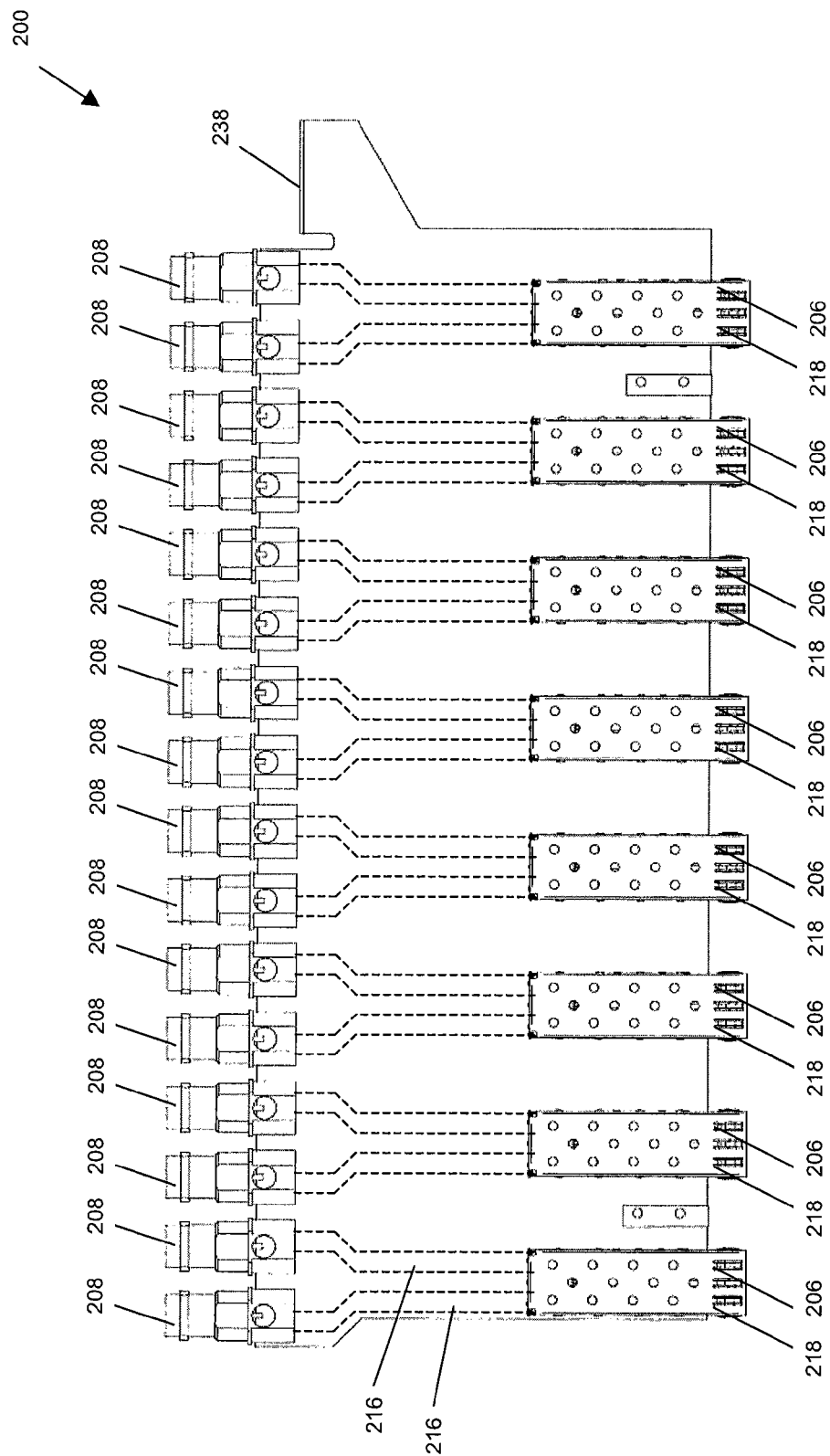
FIG. 2A is a top view of a printed circuit board in accordance with an alternate embodiment.
Figure 2B:
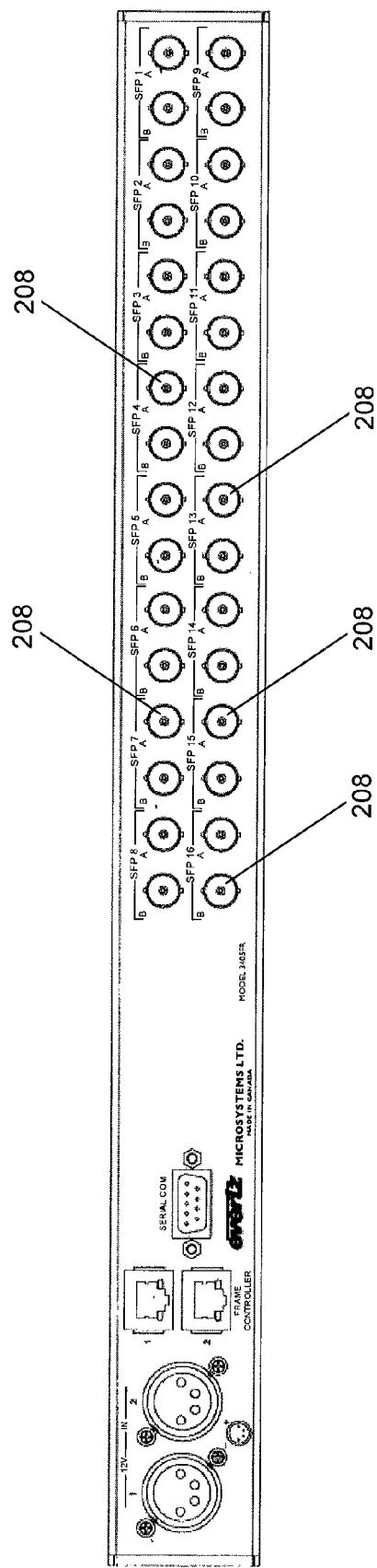
FIG. 2B is a rear view of two of the printed circuit boards of FIG. 2B inserted in the chassis.

Reference is now made to FIGS. 2A and 2B in which a main printed circuit board 200 in accordance with an alternate embodiment is illustrated. Similar to the main PCB 104 of FIGS. 1A to 1C, the main PCB 200 includes a plurality of host units 206 adapted to receive pluggable media conversion modules; a plurality of electrical cable connectors 208; a plurality of high speed traces 216 electrically connecting the host units 206 and the electrical cable connectors 208; and a plurality of electrical contacts 238 that are designed to mate with or contact corresponding electrical contacts in the configuration and monitoring unit 112 to provide electrical connectivity between the host units 106 (and ultimately the pluggable media conversion modules plugged therein), the configuration and monitoring unit 112 and the power unit 110. Each of the host units 206 includes a cage 218. Preferably each of these components operate in the same fashion as the corresponding components described in reference to FIGS. 1A to 1C.

The main differences between the main PCBs 104 of FIGS. 1A to 1C, and the PCB 200 of FIGS. 2A to 2B, are the number of electrical cable connectors, the type of electrical cable connectors, and the way by which the electrical cable connectors are connected to the main PCB 104. Specifically, in the embodiment shown in FIGS. 2A and 2B, the main PCB includes sixteen electrical cable connectors 208, and each host unit 206 is electrically connected to two electrical cable connectors 208. In addition, in the embodiment shown in FIGS. 2A to 2B, the electrical cable connectors 208 are female BNC connectors which are able to receive a coaxial cable with a male BNC connector. Furthermore, in the embodiment shown in FIGS. 2A to 2B, the electrical cable connectors 208 are directly mounted to the PCB 200, whereas, in the embodiment shown in FIG. 1A to 1C, the electrical cable connectors 208 are directly mounted to a backplane card 119 which is connected to the main PCBs 104.

Figure 3:
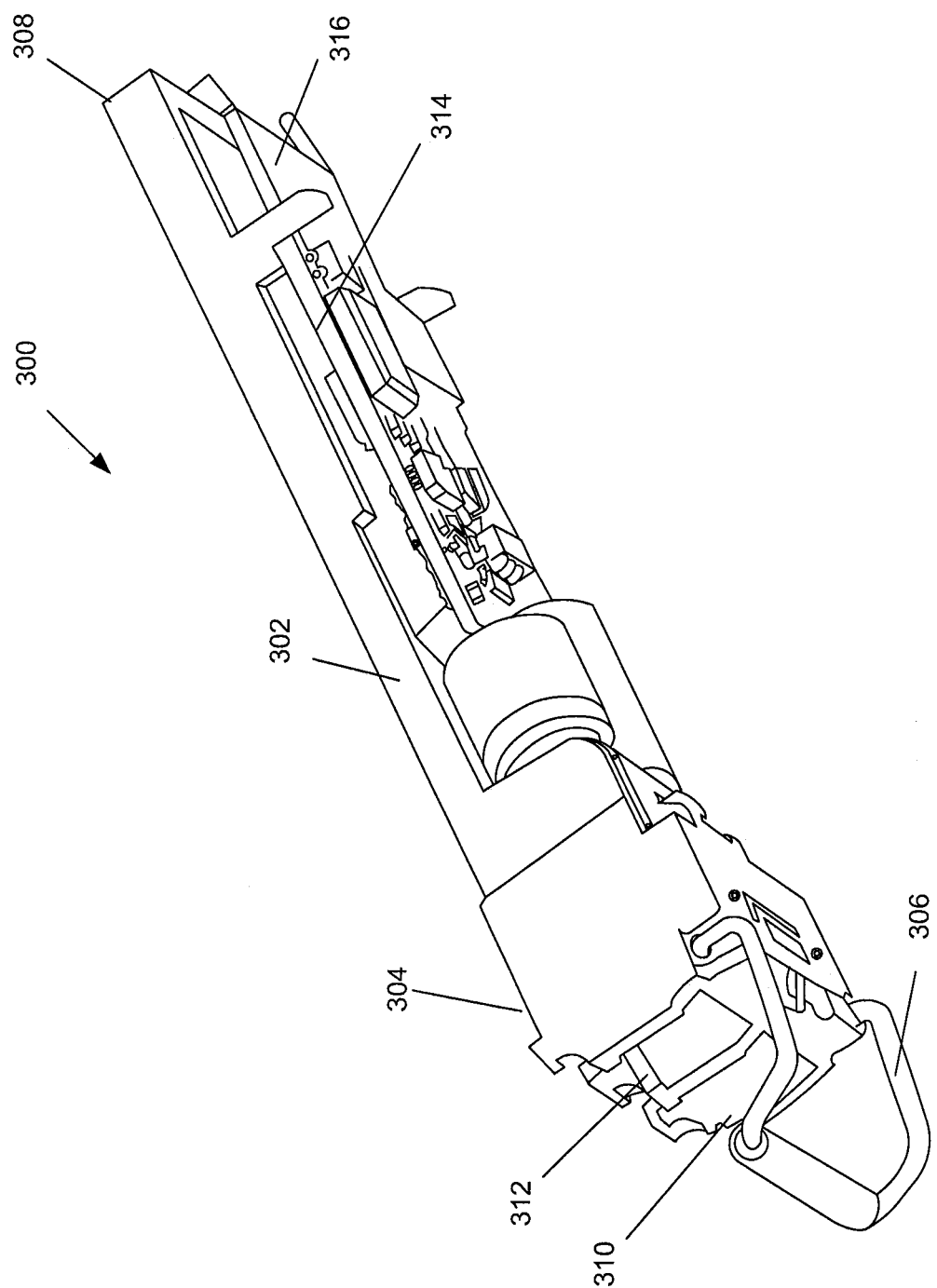
FIG. 3 is an isometric view of a pluggable media conversion module in accordance with an embodiment.

Reference is now made to FIG. 3, wherein a pluggable media conversion module 300 in accordance with an embodiment is illustrated. The pluggable media conversion module 300 includes a top piece 302 and a front piece 304. A release lever or bail 306 is mounted to the front piece 304 for releasing the pluggable media conversion module 300 from the cage 118 of the host unit 106.

Typically it is the back end 308 of the pluggable media conversion module 300 that is inserted into the cage 118 of the host unit 106 so that the front piece 304 of the pluggable media conversion module 300 is exposed. The front piece 304 includes two optical ports 310, 312 configured to receive LC optical connectors. In other embodiments, there may be a different number of optical ports and they may be configured to receive different types of optical connectors. For example, the optical ports 310, 312 may alternatively be configured to receive SC optical connectors, MU optical connectors, or other similar optical connectors.

A printed circuit board 314 is mounted to the top piece 302 and is electrically connected to the optical ports 310, 312. The printed circuit board 314 includes circuitry for (i) converting a received optical signal to an electrical signal or vice versa; and (ii) conditioning the received/produced electrical signal. Exemplary pluggable media conversion module circuitry will be described in reference to FIGS. 4 to 8. The printed circuit board 314 of the pluggable media conversion module 300 also typically includes electrical contacts 316 that mate with the electrical contacts of the host unit 106. As shown in FIG. 3, the electrical contacts 316 may be formed on a male portion of a card edge connector. As described above, the male portion of the card edge connector is designed to mate or connect with a socket of a host unit 106 (which has corresponding electrical connectors formed thereon) when the pluggable media conversion module 300 is inserted in the host unit 106. In other embodiments, the electrical contacts 316 may be formed as part of a ribbon connector.

In some embodiments, the pluggable media conversion module 300 has a standard form factor, such as the Small Form Factor Pluggable (SFP) form factor, the Small Form Factor Pluggable Plus (SFP+) form factor, or the 10 Gigabit Small Form Factor Pluggable (XFP) form factor. The SFP standard specifies an enclosure 9.8 millimeters in height, 13.5 millimeters in width and a minimum of twenty electrical input/output connections. The SFP standard is set out in the "Small Form Factor Pluggable (SFP) Transceiver Multisource Agreement (MSA)," dated Sep. 14, 2000 which is herein incorporated by reference. The XFP standard sets out the cage hardware, and IC interfaces for a 10 Gbit hot pluggable module that converts serial electrical signals to external serial optical or electrical signals.

Figure 4:
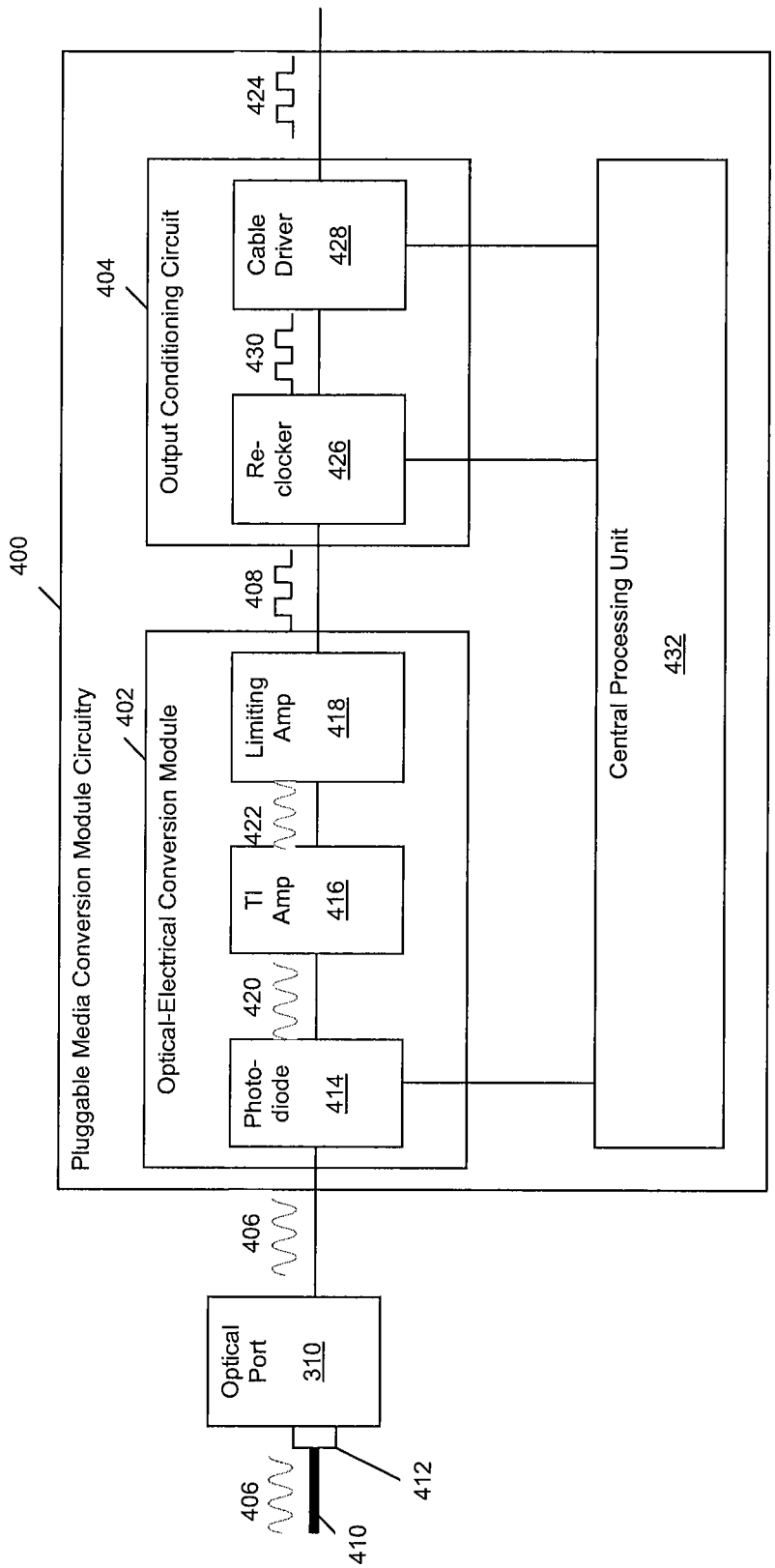
FIG. 4 is a block diagram of the circuitry of a single receiver pluggable media conversion module in accordance with an embodiment.

Reference is now made to FIG. 4, in which a block diagram of the circuitry 400 of a single receiver (RX) pluggable media conversion module in accordance with an embodiment is illustrated. The single receiver (RX) pluggable media conversion module circuitry 400 includes an optical to electrical conversion circuit 402 and an output conditioning circuit 404.

The optical to electrical conversion module 402 receives an optical video signal 406 from an optical port 310 and converts the optical video signal 406 to an electrical video signal 408. As described above, the optical port 310 is configured to receive a fiber optic cable 410 that carries the optical video signal 406. The fiber optical cable 410 includes a fiber optic connector 412 that mates with the optical port 310. The fiber optic connector 412 may be an LC optical connector, an SC optical connector, an MU optical connector, or a similar optical connector.

In one embodiment, the optical to electrical conversion module 402 includes a photodiode 414, a transimpedance amplifier 416, and a limiting amplifier 418. As is known to persons of skill in the art, a photodiode is a type of photodetector that is capable of converting light into either current or voltage. In the present application, the photodiode 414 receives the optical video signal 406 from the optical port 310 and converts it into a current signal 420. In some embodiments, the photodiode 414 may be an avalanche photodiode (APD). An APD can be described as a photodetector that uses avalanche multiplication to achieve higher optical sensitivity (between 3 to 10 dB higher) than a standard PIN photodiode detector.

As is known to persons of skill in the art, a transimpedance amplifier converts a current signal into a voltage signal. In the present application, the transimpedance amplifier 416 receives the current signal 420 produced by the photodiode 414 and converts it into a voltage signal 422. The voltage signal 422 is then received by the limiting amplifier 418 which converts it into the electrical video signal 408. Specifically, the limiting amplifier 418 receives a wide dynamic range analog signal from the transimpedance amplifier 416 and provides some amplification for low level signals and clips the output signal to a digital square wave signal.

The output conditioning circuit 404 receives the electrical video signal 408 and conditions it for transmission over an electrical signal cable. The output of the output conditioning circuit 404 is referred to as the conditioned electrical video signal 424.

In one embodiment, the output conditioning circuit 404 includes a reclocker 426, and a cable driver 428. The reclocker 426 performs a jitter removal function on the electrical video signal 408 produced by the optical to electrical conversion module 402. The reclocker 426 may be operated in manual mode where a particular data rate is specified or in an automatic mode in which the reclocker 426 automatically cycles through the different Society of Motion Picture and Television Engineers (SMPTE) data rates (e.g. SMPTE 292M, SMPTE 259M (A and C), SMPTE 244M and SMPTE 424M) and locks onto the correct data rate. The reclocker outputs a reclocked signal 430.

The cable driver 428 receives the reclocked signal 430 and converts it to the conditioned electrical signal 424 which is used to drive an electrical signal cable, such as a 75Ω coaxial cable. In some embodiments, the cable driver 428 is capable of driving a 75Ω coaxial cable between data rates of 19.39 Mbps and 4.25 Gbps. The cable driver may provide selectable slew rates to achieve compliance with SMPTE 292, SMPTE 259 (A and C), SMPTE 344M and SMPTE 424M.

In some embodiments, the circuit 400 also includes a central processing unit (CPU) 432. The central processing unit 432 may monitor the re-clocker 426 to determine the signal standard or rate that the re-clocker 426 "locks" onto. Based on the signal standard or rate locked onto, the central processing unit 432 provides a control signal to the cable driver 428 to apply slew rates appropriate to the signal standard. In some embodiments, the central processing unit 432 may also monitor the photodiode 414 current. The central processing unit 432 converts the photodiode 414 current into an optical power signal and provides this signal to the frame or system controller 112.

Because the pluggable media conversion module circuitry 400 includes an output conditioning circuit 404, the pluggable media conversion module can be directly connected to an electrical signal cable, such as a 50Ω or 75Ω coaxial cable, without any intermediary active components. Specifically, this allows the signal path (i.e. high-speed trace 116) between the host unit (and thus the pluggable media conversion module) and the corresponding electrical cable connectors to be completely passive.

Figure 5:
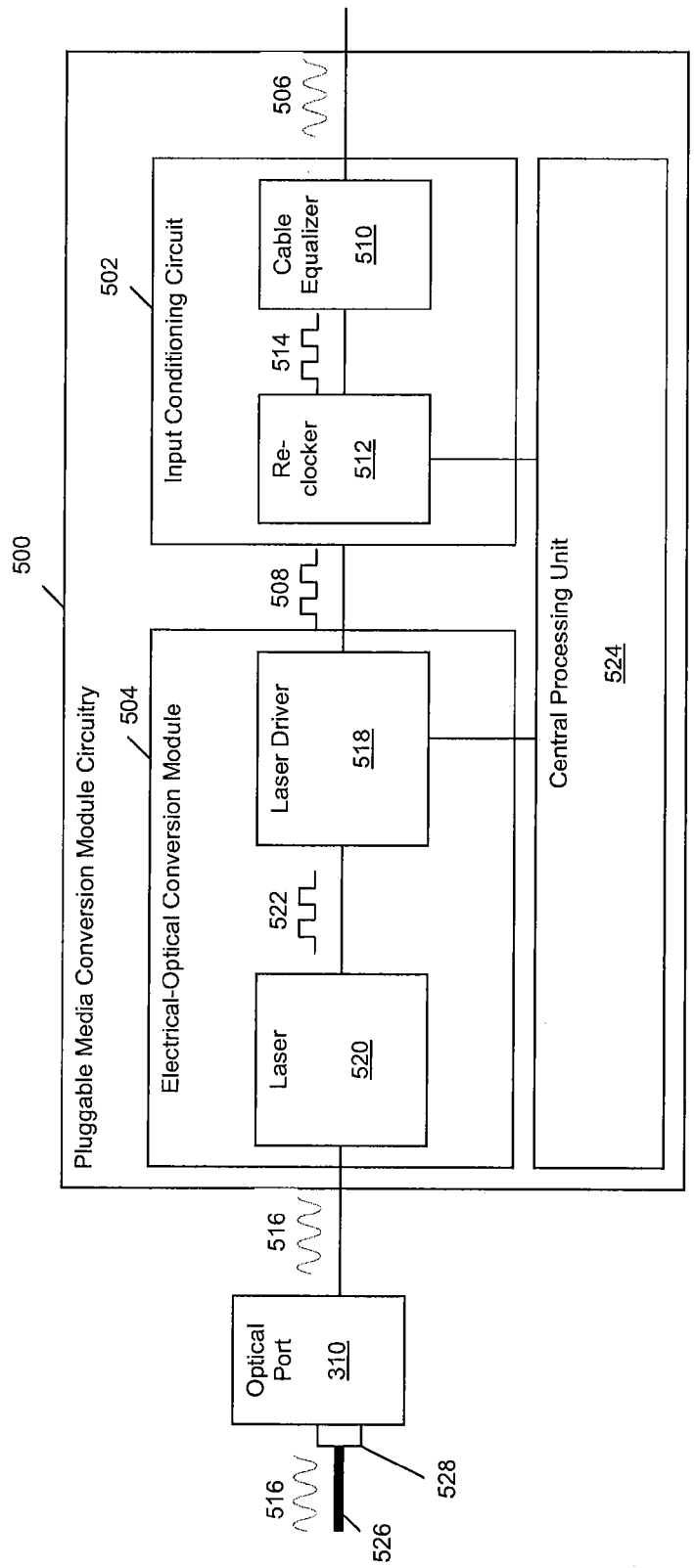
FIG. 5 is a block diagram of the circuitry of a single transmitter pluggable media conversion module in accordance with an embodiment.

Reference is now made to FIG. 5 in which a block diagram of the circuitry 500 for a single transmitter (TX) pluggable media conversion module in accordance with an embodiment is illustrated. The single transmitter (TX) pluggable media conversion module circuitry 500 includes an input conditioning circuit 502, and an electrical to optical conversion module 504.

The input conditioning circuit 502 receives an electrical video signal 506. Typically the electrical video signal 506 will be provided to the input conditioning circuit 502 via an electrical signal cable, such as a 50Ω or 75Ω coaxial cable, which is plugged into a corresponding electrical cable connector 108. The input conditioning circuit 502 prepares or conditions the received electrical video signal 506 for further processing and outputs a conditioned electrical video signal 508.

In one embodiment, the input conditioning circuit 502 includes a cable equalizer 510 and a reclocker 512. As is known to those persons of skill in the art, cable equalizers are typically used to compensate for the distortion caused by the communications channel over which a video signal was transmitted. If the characteristics of the channel are known, the equalizer can be fixed, or non-adaptive. If the characteristics of the channel are not known, the equalizer may be adaptive. In the present application, equalizer 510 receives a single-ended electrical video signal 506 from an electrical signal cable and converts it into an equalized differential electrical video signal 514.

The reclocker 512 receives the equalized electrical video signal 514 from the cable equalizer 510 and automatically detects and locks onto the signal and outputs the conditioned electrical signal 508. The reclocker 512 performs clock and data recovery of the equalized electrical video signal 514. The reclocker 512 may be operated in manual mode where a particular data rate is specified or in an automatic mode in which the reclocker 512 automatically cycles through the different Society of Motion Picture and Television Engineers (SMPTE) data rates (e.g. SMPTE 292M, SMPTE 259M (A and C), SMPTE 244M and SMPTE 424M) and locks onto the correct data rate.

The electrical to optical conversion module 504 receives the conditioned electrical video signal 508 from the input conditioning circuit 502 and converts it to an optical video signal 516. In one embodiment, the electrical to optical conversion module 504 includes a laser driver 518 and a laser 520. The laser driver 518 receives the conditioned electrical signal 508 and generates a control signal 522 which is used by the laser 520 to generate the optical video signal 516.

Most laser drivers use conventional automatic power control circuit to maintain a constant output power laser signal. However, professional digital video signals, such as serial digital interface (SDI) and high-definition serial digital interface (HD-SDI) video signals, contain pathological patterns (patterns with long durations of "1's" or "0's") which conventional automatic power control circuits cannot accurately process. One specific pathological pattern consists of 19 bits of one polarity followed by one bit of the opposite polarity. This produces a signal with either a very high or very low duty cycle. Conventional automatic power control circuits assume incoming data will have a constant average duty cycle of about 50% over a period of time (i.e. 1 μs). Since a pathological pattern may last for about 63.5 μs, the laser driver output of the optical transmitter would be adjusted too high or two low, depending on the duty cycle of the signal. Accordingly, conventional automatic power control circuits cannot typically process professional digital video signal without producing data errors.

To address this problem, in some embodiments, the circuit 500 includes a central processing unit 524 that controls the operation of the laser driver 518. Specifically, the central processing unit 524 monitors the current of the back facet photodiode of the laser driver 518 and compares this to a reference current value that was established during initial calibration of the laser driver 518. The central processing unit 524 then drives the laser driver 518 bias control in the positive or negative direction to match the reference current value.

The optical video signal 516 produced by the electrical to optical conversion module 504 is then output to an optical port 310. As described above, the optical port 310 is configured to receive a fiber optic cable 526 that can carry the optical video signal 516. The fiber optic cable 526 includes a fiber optic connector 528 that mates with the optical port 310. The fiber optic connector 528 may be an LC optical connector, an SC optical connector, an MU optical connector, or any other similar optical connector. The optical port 310 transmits the optical video signal 516 received from the electrical to optical conversion module 504 to the fiber optic cable 526.

Because the pluggable media conversion module circuitry 500 includes an input conditioning circuit 502, the pluggable media conversion module can be directly connected to an electrical signal cable, such as a 50Ω or 75Ω coaxial cable, without any intermediary active circuits or components. More specifically, this allows the signal path (i.e. high-speed trace 116) between the host unit (and thus the pluggable media conversion module) and the corresponding electrical cable connectors to be completely passive.

It should be noted that the pluggable conversion module circuits 400, 500 shown in FIGS. 4 and 5 are exemplary pluggable conversion module circuits of single receiver (RX) and single transmitter (TX) embodiments respectively and do not limit the invention to those embodiments. It will be evident to a person of skill in the art that the components of the pluggable media conversion module circuits shown in FIGS. 4 and 5 can be combined to form dual transmitter (TX), dual receiver (RX), transceiver (TX/RX), or optical regenerator pluggable conversion module circuits. Exemplary dual receiver (RX), dual transmitter (TX), and optical regenerator pluggable media conversion module circuits will be described in reference to FIGS. 6 to 8 to illustrate how the components of FIGS. 4 and 5 can be combined to form other pluggable media conversion modules.

Figure 6:
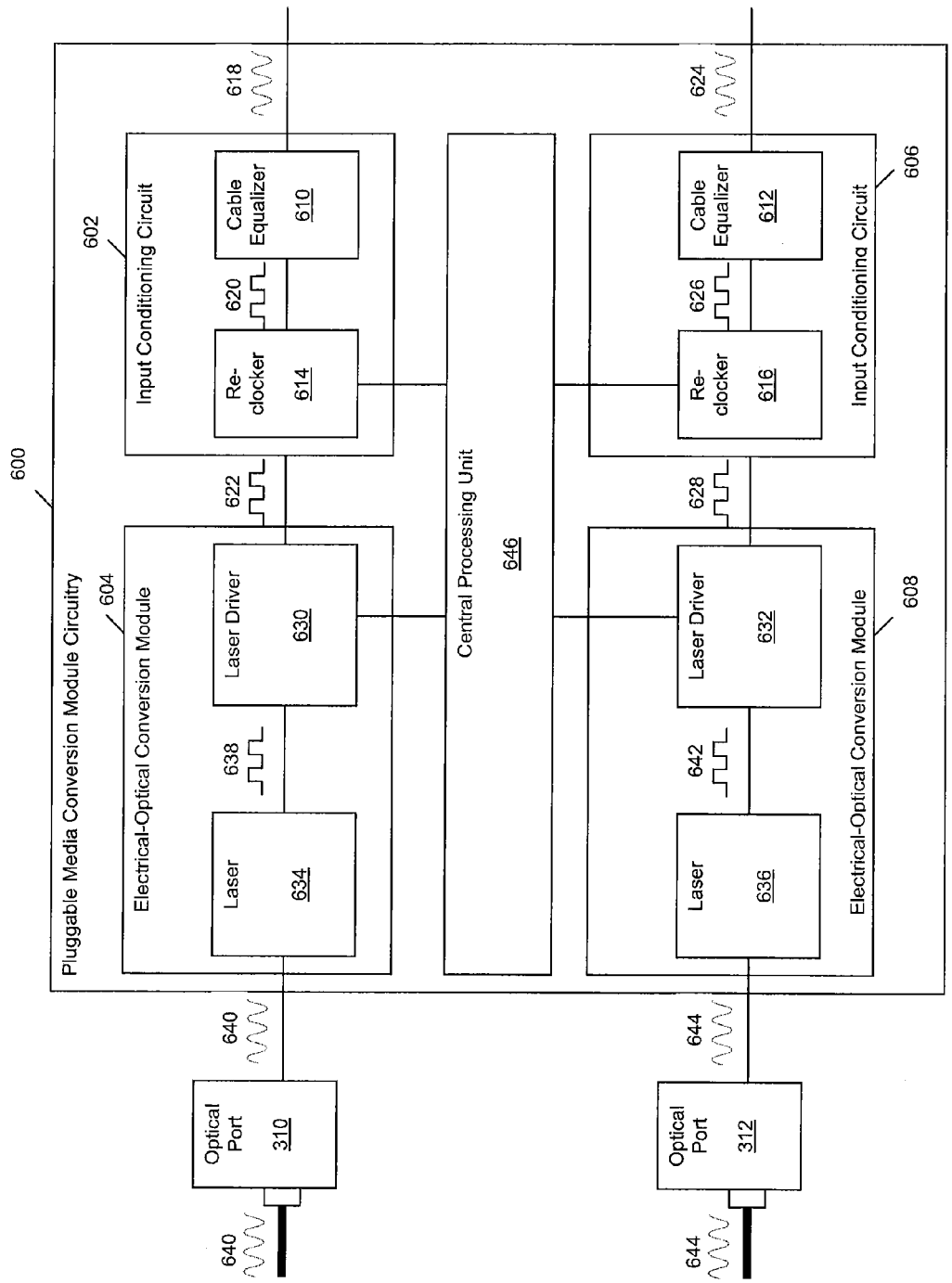
FIG. 6 is a block diagram of the circuitry of a dual transmitter pluggable media conversion module in accordance with an embodiment.

Reference is now made to FIG. 6 in which a block diagram of the circuitry 600 for a dual transmitter (TX) pluggable media conversion module in accordance with an embodiment is illustrated. As described above, a dual transmitter (TX) pluggable media conversion module receives two electrical video signals and converts them into optical video signals. As can be seen from comparing FIGS. 5 and 6, the dual transmitter (TX) pluggable media conversion module circuitry can be generated by combining two signal transmitter (X) pluggable media conversion module circuits 500.

Specifically, the dual transmitter (TX) pluggable media conversion module circuitry 600 includes a first input conditioning circuit 602, a first electrical to optical conversion module 604, a second input conditioning circuit 606 and a second electrical to optical conversion module 608.

Both input conditioning circuits 602 and 606 include a cable equalizer 610, 612 and a reclocker 614, 616 which operate in the same manner as the cable equalizer 510 and reclocker 512 of the circuitry 500 of FIG. 5. Specifically, the first cable equalizer 610 receives a first electrical video signal 618 and equalizes it to produce a first equalized electrical video signal 620. The first equalized electrical signal 620 is received by the first reclocker 614 which reclocks it to produce a first conditioned electrical video signal 622. Similarly, the second cable equalizer 612 receives a second electrical video signal 624 and equalizes it to produce a second equalized electrical video signal 626. The second equalized electrical signal 626 is received by the second reclocker 616 which reclocks it to produce a second conditioned electrical video signal 628. In other embodiments, the input conditioning circuits 602 and 606 do not include reclockers 614 and 616. The reclockers 614 and 616 simply enhance performance by removing jitter from the input signal.

Both electrical to optical conversion modules 604 and 608 include a laser driver 630, 632 and a laser 634, 636 which operate in the same manner as the laser driver 518 and laser 520 of the circuitry 500 of FIG. 5. Specifically, the first laser driver 630 receives the first conditioned electrical video signal 622 and generates a first control signal 638 which is used by the first laser 634 to generate a first optical video signal 640. Similarly, the second laser driver 632 receives the second conditioned electrical video signal 628 and generates a second control signal 642 which is used by the second laser 636 to generate a second optical video signal 644.

The circuitry 600 of FIG. 6 my also include central processing unit 646 that controls both the first an second laser drivers 630 and 632 in the same manner as the central processing unit 524 controls the reclocker 512 of FIG. 5.

Figure 7:
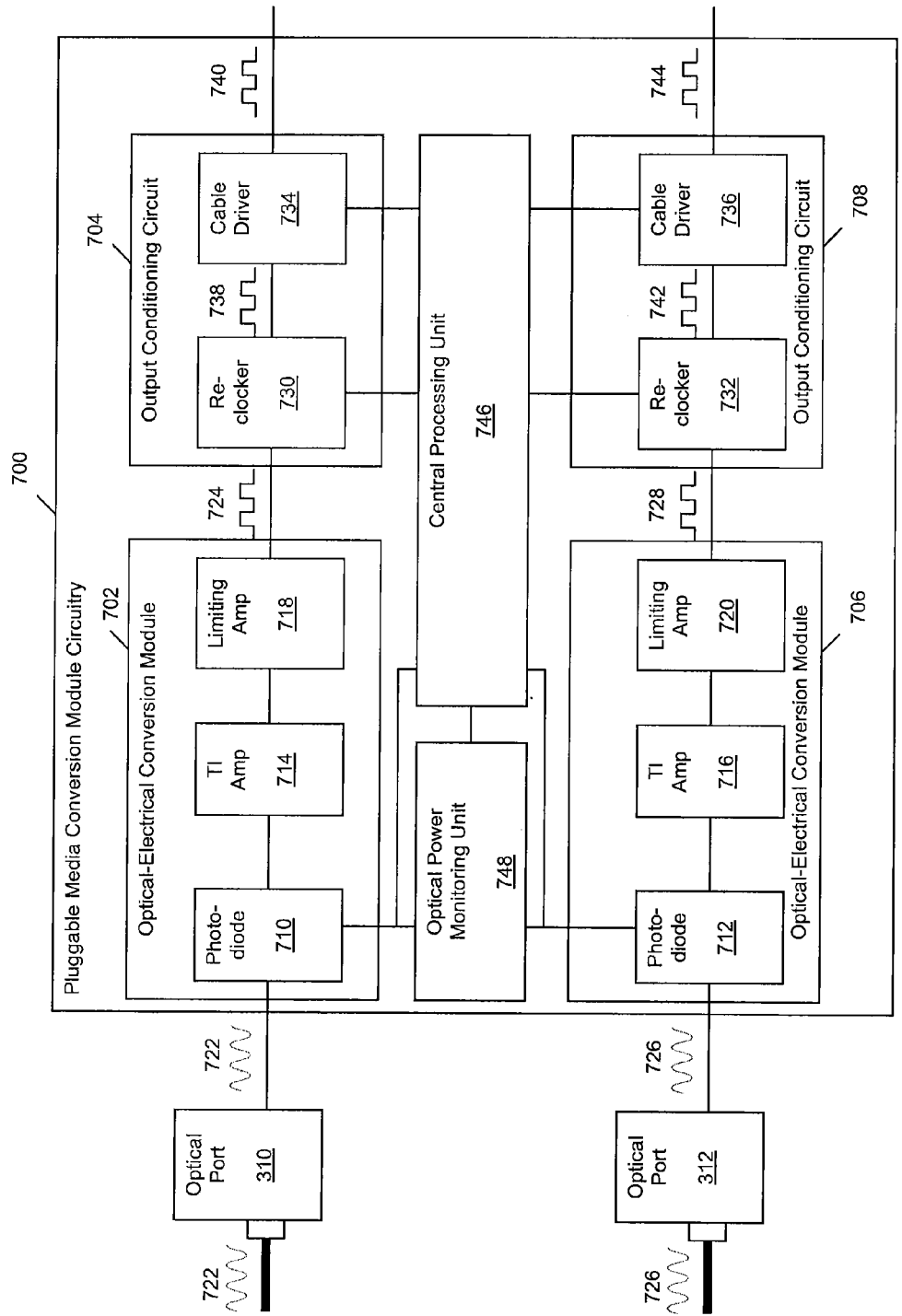
FIG. 7 is a block diagram of the circuitry of a dual receiver pluggable media conversion module in accordance with an embodiment.

Reference is now made to FIG. 7 in which a block diagram of the circuitry 700 for a dual receiver (RX) pluggable media conversion module in accordance with an embodiment is illustrated. As described above, a dual receiver (RX) pluggable media conversion module receives two optical video signals and converts them into electrical video signals. As can be seen from comparing FIGS. 4 and 7, the dual receiver (RX) pluggable media conversion module circuitry can be generated by combining two signal transmitter (X) pluggable media conversion module circuits 400.

Specifically, the dual receiver (RX) pluggable media conversion module circuitry 700 includes a first optical to electrical conversion module 702, a first output conditioning circuit 704, a second optical to electrical conversion module 706, and a second output conditioning circuit 708.

Both optical to electrical conversion modules 702 and 706 include a photodiode 710, 712, a transimpedance amplifier 714, 716 and a limiting amplifier 718, 720 which operate in the same manner as the photodiode 414, transimpedence amplifier 416 and limiting amplifier 418 of the circuitry 400 of FIG. 4. Specifically, the first photodiode 710, the first transimpedance amplifier 714 and the first limiting amplifier 718 work together in the manner described above to convert a first optical video signal 722 into an electrical video signal 724. Similarly, the second photodiode 712, the second transimpedance amplifier 716 and the second limiting amplifier 720 work together in the manner described above to convert a second optical video signal 726 to a second electrical video signal 728.

Both output conditioning circuits 704 and 708 includes a reclocker 730, 732 and a cable driver 734, 736 which operate in a similar manner as the reclocker 426 and cable driver 428 of the circuitry 400 of FIG. 4. Specifically, the first reclocker 730 receives the first electrical video signal 724 and performs clock and data recovery of the first electrical video signal 724 to produce a first reclocked electrical video signal 738. The first cable driver 734 receives the first reclocked electrical video signal 738 and converts it to a conditioned electrical signal 740 which is used to drive an electrical signal cable, such as a 75Ω coaxial cable. Similarly, the second reclocker 732 receives the second electrical video signal 728 and performs clock and data recovery of the second electrical video signal 728 to produce a second reclocked electrical video signal 742. The second cable driver 736 receives the second reclocked electrical video signal 742 and converts it to a second conditioned electrical signal 744 which is used to drive an electrical signal cable, such as a 75 coaxial cable. In other embodiments, the output conditioning circuits 704 and 708 do not include reclockers 730 and 734. The reclockers 730 and 734 simply enhance performance by removing jitter from the input signal.

The circuitry 700 of FIG. 7 may also include central processing unit 746 that controls both the first and second cable drivers 734 and 736 in the same manner as the central processing unit 432 control s the cable driver 428 of FIG. 4.

The circuitry 700 of FIG. 7 may also include optical power monitoring unit 748 which monitors the power of the first and second optical video signals 722 and 726. Specifically the optical power monitoring unit 748 monitors the photodiode 710, 712 current and internally converts this into an optical power. This typically involves performing an inverse log on the photodiode 710, 722 current to linearize it, and then comparing the linearized current to calibrated values. The optical power monitoring unit 748 then provides the optical power to the central processing unit 746 which reports this to the frame or system controller 124.

Figure 8:
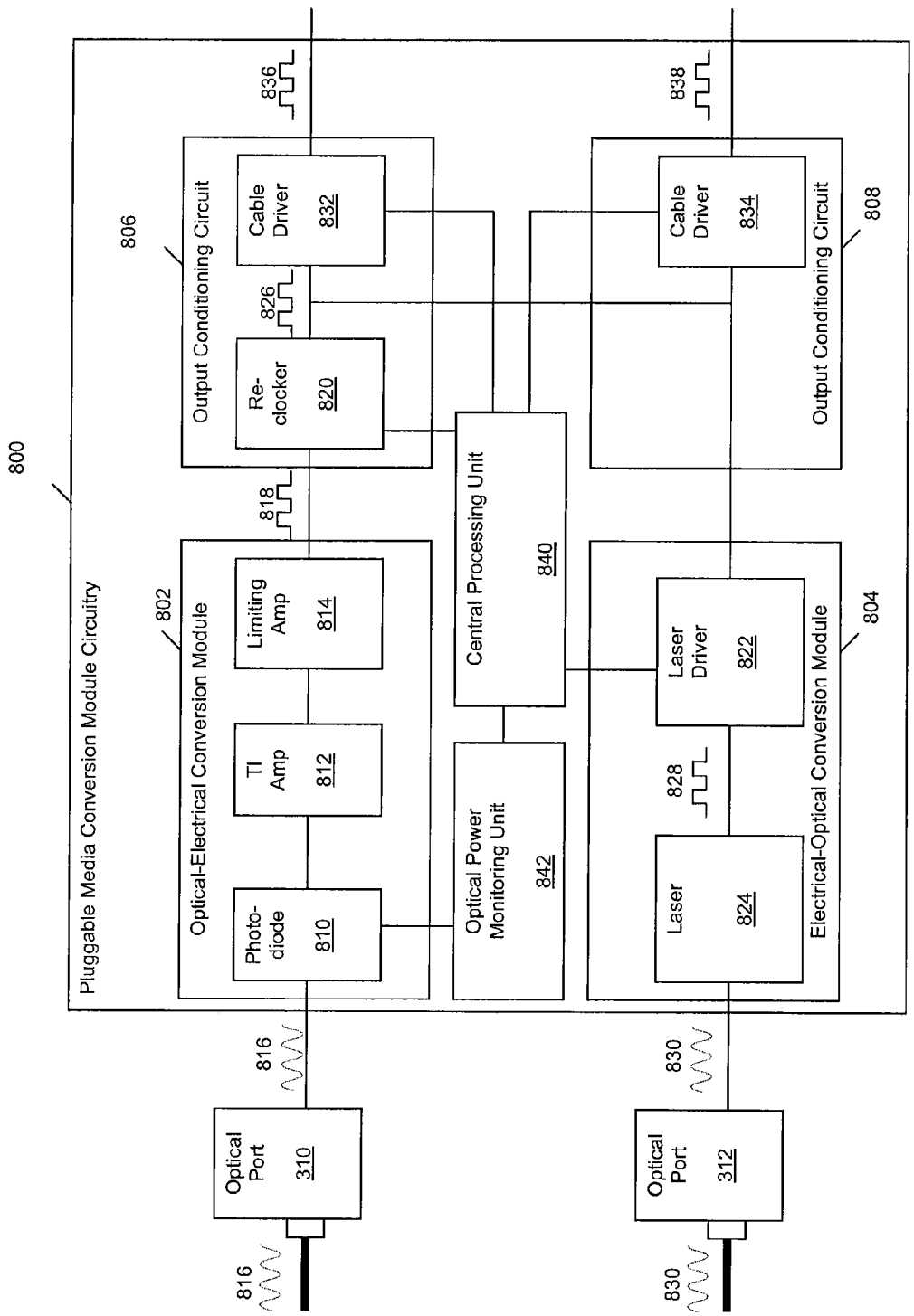
FIG. 8 is a block diagram of the circuitry of an optical regenerator pluggable media conversion module in accordance with an embodiment.

Reference is now made to FIG. 8 in which a block diagram of the circuitry 800 for an optical regenerator pluggable media conversion module in accordance with an embodiment is illustrated. As described above, an optical regenerator pluggable media conversion module receives an optical video signal, converts the optical video signal to an electrical video signal, outputs the electrical video signal, regenerates the optical signal from the electrical signal, and outputs the regenerated optical signal.

As can be seen from comparing FIGS. 4, 5 and 8, the optical regeneration pluggable media conversion module circuitry 800 can be generated by combining the optical to electrical conversion module 402 of FIG. 4, the electrical to optical conversion module 504 of FIG. 5 and the output conditioning circuit 404 of FIG. 4. Specifically, the optical regenerator pluggable media conversion module circuit 800 includes an optical to electrical conversion module 802, an electrical to optical conversion module 804, and first and second output conditioning circuits 806, 808.

The optical to electrical conversion module 802 includes a photodiode 810, a transimpedance amplifier 812 and a limiting amplifier 814 which operate in the same manner as the photodiode 414, transimpedence amplifier 416 and limiting amplifier 418 of the circuitry 400 of FIG. 4. Specifically, the photodiode 810, the transimpedance amplifier 812 and the limiting amplifier 814 work together in the manner described above to convert a first optical video signal 816 into a first electrical video signal 818.

The electrical to optical conversion module 804 includes a reclocker 820 (which is shared with the two output conditioning circuits 806 and 808), a laser driver 822 and a laser 824 which operate in the same manner as the reclocker 512, laser driver 518 and laser 520 of the circuitry 500 of FIG. 5. Specifically, the reclocker 820 receives the first electrical video signal 818 and performs clock and data recovery of the first electrical video signal 818 to produce a first reclocked electrical video signal 826. The laser driver 822 receives the first reclocked electrical video signal 826 and generates a control signal 828 which is used by the laser 824 to generate a second optical video signal 830 which is a regenerated version of the first optical video signal 816.

Both output conditioning circuits 806 and 808 include the reclocker 820 and a cable driver 832, 834 which operate in a similar manner as the reclocker 426 and cable driver 428 of the circuitry 400 of FIG. 4. Specifically, as described above, the reclocker 820 receives the first electrical video signal 818 and performs clock and data recovery of the first electrical video signal 818 to produce the first reclocked electrical video signal 826. The first and second cable drivers 832 and 834 receive the first reclocked electrical video signal 826 and convert it to conditioned electrical signals 836 and 838 which are used to drive electrical signal cables, such as 75Ω coaxial cables.

The present invention has been described here by way of example only. Various modification and variations may be made to these exemplary embodiments without departing from the spirit and scope of the invention, which is limited only by the appended claims.

We claim:

1. A media conversion system comprising:
   at least two pluggable media conversion modules, the pluggable media conversion modules for converting between at least two optical video signals and at least two electrical video signals; and a printed circuit board configured to receive the at least two pluggable media conversion modules, the printed circuit board further configured to receive at least two electrical cable connectors at one end of the printed circuit board for coupling the printed circuit board to at least two electrical signal cables, and the printed circuit board comprising at least two signal paths for transporting the at least two electrical video signals between the at least two pluggable media conversion modules and the at least two electrical cable connectors, each of the at least two signal paths being an electrical trace on the printed circuit board and each electrical trace being completely passive.

2. The media conversion system of claim 1, wherein the printed circuit board is completely passive.

3. The media conversion system of claim 1, wherein the at least two pluggable conversion each comprise a conditioning circuit for conditioning at least one electrical video signal.

4. The media conversion system of claim 3, wherein each of the conditioning circuits comprises at least one of a cable driver, an equalizer, and a reclocker.

5. The media conversion system of claim 1, wherein at least one of the at least two pluggable media conversion modules comprises a conversion circuit for converting between at least one of the optical video signal and the electrical video signal.

6. The media conversion system of claim 5, wherein the function of the conversion circuit is to perform one or more of converting at least one optical video signal to at least one electrical video signal, and converting the at least one electrical video signal to the at least one optical video signal.

7. The media conversion system of claim 6, wherein the function of the conversion circuit dictates the function of at least one of the at least two electrical cable connector connected thereto.

8. The media conversion system of claim 1, further comprising a fan unit proximate the printed circuit board for dissipating heat created by the at least two pluggable media conversion modules.

9. The media conversion system of claim 1, wherein at least one of the at least two electrical video signals is a single-ended unbalanced signal.

10. The media conversion system of claim 1, wherein each of the at least two pluggable media conversion modules comprises at least one optical port for receiving an optical cable, the optical cable for carrying at least one of the at least two video optical signals.

11. The media conversion system of claim 1, wherein the printed circuit board comprises at least one host unit adapted to receive at least one of the at least two pluggable media conversion modules.

12. The media conversion system of claim 11, wherein each of the at least two electrical traces connects the at least one host unit to at least one of the at least two electrical cable connectors.

13. The media conversion system of claim 12, wherein the at least two electrical traces comprise microstrip.

14. The media conversion system of claim 12, wherein the at least two electrical traces comprise stripline.

15. The media conversion system of claim 1, wherein at least one of the at least two electrical cable connectors is adapted to receive an electrical signal cable for carrying at least one of the at least two electrical video signals.

16. The system of claim 1, wherein the at least two pluggable media conversion modules are of a type selected from a group consisting of a single-transmitter module, a dual-transmitter module, a single-receiver module, a dual-receiver module, a transceiver module, and an optical-regeneration module.

17. the system of claim 16, wherein the at least two pluggable media conversion modules comprise a first pluggable media conversion module and a second pluggable media conversion module, and the type of the first pluggable media conversion module is different from the type of the second pluggable media conversion module.

18. A media conversion system comprising:

at least one pluggable media conversion module for converting between at least one optical video signal and at least one electric signal;

a printed circuit board configured to receive the at least one pluggable media conversion module, the printed circuit board further configured to receive at least one electrical cable connector at one end of the printed circuit board for coupling the printed circuit board to an electric signal cable, and the printed circuit board comprising at least one signal path for transporting the at least one electrical video signal between the at least one pluggable media conversion module and the at least one electrical cable connector, each of the at least one signal path being an electrical trace on the printed circuit board and each electrical trace being completely passive; and a configuration and monitoring unit in communication with the at least one pluggable media conversion module for monitoring the at least one pluggable media conversion module for failure.

19. A media conversion system comprising:

at least one pluggable media conversion module for converting between at least one optical video signal and at least one electrical video signal; and a printed circuit board comprising at least one host unit adapted to receive the at least one pluggable media conversion module, the printed circuit board configured to receive at least one electrical cable connector at one end of the printed circuit board for coupling the printed circuit board to an electric signal cable, and the printed circuit board comprising at least one signal path for transporting the at least one electrical video signal between the at least one host unit and the at least one electrical cable connector, each of the at least one signal path being an electrical trace on the printed circuit board and each electrical trace being completely passive;

wherein the at least one host unit is configured to receive at least two different types of pluggable media conversion modules.

20. the system of claim 19, wherein the types of pluggable media conversion modules that the host unit is configured to receive are selected from the group consisting of a single-transmitter module, a dual-transmitter module, a single-receiver module, a dual-receiver module, a transceiver module, and an optical-regeneration module.

\* \* \* \* \*